US007571211B1

(12) United States Patent
Melick et al.

(10) Patent No.: US 7,571,211 B1
(45) Date of Patent: Aug. 4, 2009

(54) METHOD FOR ROUTING MESSAGES OVER A NETWORK BASED ON LOCATION

(75) Inventors: Bruce D. Melick, Cedar Rapids, IA (US); David M. Snyder, Cedar Rapids, IA (US); Leslie D. Baych, Cedar Rapids, IA (US); Dennis L. Roland, Cedar Rapids, IA (US); Gregory P. Probst, Iowa City, IA (US); Joseph A. Gerke, Ely, IA (US); Philip T. Kennedy, Cedar Rapids, IA (US)

(73) Assignee: Lightwaves Systems, Inc., Cedar Rapids, IA (US)

( * ) Notice: Subject to any disclaimer, the term of this patent is extended or adjusted under 35 U.S.C. 154(b) by 0 days.

(21) Appl. No.: 10/413,801

(22) Filed: Apr. 15, 2003

Related U.S. Application Data

(60) Provisional application No. 60/372,505, filed on Apr. 15, 2002.

(51) Int. Cl.
*G06F 15/16* (2006.01)
(52) U.S. Cl. .................. 709/206; 379/88.13; 379/88.17
(58) Field of Classification Search ................ 379/67.1, 379/88.11, 88.16, 88.19, 88.2, 88.21, 88.22, 379/201.01, 88.12, 207.02, 93.01, 88.13, 379/88.17; 709/206
See application file for complete search history.

(56) References Cited

U.S. PATENT DOCUMENTS

| 5,982,276 A | 11/1999 | Stewart ................. 340/310.01 |
| 6,163,597 A * | 12/2000 | Voit ........................ 379/93.17 |
| 6,185,290 B1 | 2/2001 | Shaffer et al. .......... 370/220.01 |
| 6,195,484 B1 | 2/2001 | Brennan, III et al. .......... 385/37 |
| 6,236,652 B1 | 5/2001 | Preston et al. .............. 370/349 |
| 6,430,208 B1 | 8/2002 | Fullerton et al. ............ 375/130 |
| 6,480,885 B1 * | 11/2002 | Olivier ...................... 709/207 |
| 6,532,256 B2 | 3/2003 | Miller ....................... 375/222 |
| 2001/0036183 A1 | 11/2001 | Melick et al. ................ 370/389 |
| 2002/0016905 A1 | 2/2002 | Kojima et al. ................. 712/36 |
| 2002/0059381 A1 * | 5/2002 | Cook et al. .................. 709/206 |
| 2002/0059642 A1 | 5/2002 | Russ et al. .................. 725/135 |
| 2002/0075972 A1 | 6/2002 | Richards et al. ............. 375/324 |
| 2002/0089423 A1 | 7/2002 | Przygoda, Jr. ............... 340/540 |
| 2003/0142797 A1 * | 7/2003 | Troy et al. ............... 379/88.12 |
| 2004/0140928 A1 | 7/2004 | Cleghorn |

FOREIGN PATENT DOCUMENTS

| WO | WO 00/41383 A1 | 7/2000 |
| WO | WO 00/54488 A1 | 9/2000 |

\* cited by examiner

*Primary Examiner*—Simon Sing
(74) *Attorney, Agent, or Firm*—McKee, Voorhees & Sease. P.L.C.

(57) ABSTRACT

The present invention provides a method and devices for unified messaging. One method provides for receiving a message having a first identifier associated with a user, translating the first identifier associated with the user to a second identifier comprising a zip code and a street address, the second identifier being associated with a network address, and sending the message to the user at the network address. A line interface device of the present invention is associated with an address that comprises a zip code.

17 Claims, 4 Drawing Sheets

METHOD FOR ROUTING MESSAGES OVER A NETWORK BASED ON LOCATION

STATEMENT OF RELATED APPLICATIONS

This application claims priority to U.S. Provisional Patent Application No. 60/372,505, herein incorporated by reference in its entirety.

BACKGROUND OF THE INVENTION

1. Field of the Invention

The present invention relates generally to an integrated system which routes messages such as e-mail, voice mail, video, faxes, instant messages, etc. In particular, the present invention relates to the use of existing demographic, and/or other personal information, and/or affinity flags, and/or location flags, and/or time and date flags to create universal identifiers and filters for the purpose of routing and delivering messages. These may originate in the form of e-mail, instant messages, voice input, video input, etc. These messages may be delivered to devices such as, but not limited to cell phones, computers, PDAs, pagers, fax machines, interactive TVs, video displays, kiosks, and/or other devices over a switched and/or packet network.

2. Problems in the Art

No single approach to unified messaging contains all the necessary features in order to create a truly "unified" messaging system. Two pending patents, Ranalli, Douglas, J., et al, International Publication Number WO 00/41383, and Hamilton, Michael, et al, International Publication Number WO 00/54488, incorporated herein by reference, describe similar approaches to unified messaging systems. The Ranalli patent anticipates the rise of Internet Protocol (IP) telephony and describes a version of a unified messaging system in which telephone numbers are correlated to an Internet address to enable communications over the Internet. It goes on to describe the use of unique identifiers to further enhance the system. One embodiment of the Ranalli patent application uses ENUM as an e-mail alias. ENUM is an initiative of the telephone numbering working group of the Internet Engineering Task Force (IETF) which describes a mechanism using the Internet Domain Name System (DNS) to map E.164 numbers to URLs. E.164 is an International Telecommunication Union (ITU) standard that describes the format of telephone numbers used around the world. The proliferation of a multitude of communication devices that access different networks such as public switched telephone network (PSTN) and Internet, through different address conventions such as phone number, email address, etc., and input capabilities (telephone, computer, PDA) has created a problem. This creates the need for a method which allows easy accessing of the growing list of emerging devices and appliances, regardless of the platform to which they are connected or which device is being used to access the information. ENUM, a partial solution to this growing problem, is a convergence solution that bridges PSTN and Internet networks. One of the side benefits of the ENUM initiative is single number connectivity to an individuals land-line phone(s), mobile phone(s), fax(s), etc. However, ENUM is not a complete solution as it is dependant on knowledge of a telephone number as a unique identifier.

The Hamilton patent application previously mentioned describes a version of a unified messaging system which creates e-mail aliases from a telephone number and correlates them to an X.509 digital certificate. The Hamilton patent application also uses automatic number identification (ANI) and/or Caller-ID as a security feature for distributing private keys for X.509 digital certificates. Both the Ranalli and Hamilton patent applications can be used as global directories, and allow for personal control of messaging. While these are unique methods for aggregating and routing messages based on telephone numbers, they are not all inclusive in their scope of various aliases that can be used in a unified messaging system.

Microsoft Outlook, a widely used personal and enterprise contact manager and e-mail program can contain the same basic demographic information and telephone numbers discussed in the Hamilton and Ranalli patent applications, but is not capable of using aliases to send and receive e-mail messages. However, Microsoft Outlook is capable of using digital certificates as described in the Hamilton and Ranalli patent applications.

Novell's eDirectory software product is an enterprise-level unified messaging system. The eDirectory software is a Lightweight Directory Access Protocol (LDAP)-enabled, directory-based identity management system that centralizes the management of user identities, access privileges and other network resources.

The Ranalli and Hamilton patent applications previously mentioned, Microsoft's Outlook, and Novell's eDirectory do not include references to geo-spatial coordinates, such as latitude, longitude, time, or combinations of these, as unique identifiers. Also, none of these patents or software applications use affinity flags, and/or location flags, and/or calendar flags as keys for unified messaging.

Also, neither the Ranalli nor Hamilton patent applications previously mentioned include the use of the television sets connected via the cable TV network, or a next generation intelligent network as a method for delivering e-mails using the readily available cable TV customer database which includes telephone number and street address which can be used as e-mail aliases.

In 2000, the United States Post Office stated its intentions to set-up a secure, individual electronic mail box and e-mail address that associates a person's street address, with usps.com to create an e-mail address based on location. However, such a system would be limited because it uses only street addresses as unique identifiers for users of their system. It does not use references to geo-spatial coordinates, such as latitude, longitude, time, or combinations of these, as unique identifiers. In addition, such an approach requires enormous costs to set-up and maintain hundreds of millions of electronic mail boxes.

U.S. Pat. No. 6,185,290 to Shaffer et al, incorporated herein by reference, describes databases with geo-spatial key references linked to telephone numbers. Shaffer et al. describes an intelligent call processing system that provides service benefits to a caller, a servicing location and/or a vanity number advertiser during a call, parallel to the call and/or post call in an integrated common architecture. To provide these benefits, the system utilizes a virtual telephone number database containing a nation-wide master list of telephone numbers with thousands of attribute data items associated by geo-spatial keys linked to each telephone number. Although Shaffer et al. links telephone numbers to geo-spatial keys, it does not do so for the purpose of unified messaging.

Quova, Inc.'s services are based upon the company's patent-pending techniques to map Internet infrastructure information associated with a known universe of over four billion IP addresses on the Internet. Quova's worldwide network of servers provides the geographic location of Internet users when they access a Web site. Quova's enterprise-class solution, GeoPoint, determines geographic location by continent, country, region, state, DMA (designated market area), metropolitan area, and city. The downside of Quova's technology is that it is not as accurate as geo-positions related to GPS or even street address information. Also, Quova is a service and not a self-provisioning feature of a client device originating a message, which causes extra time on the network infrastructure.

A radical advance in message routing is described in U.S. Patent application 20010036183 to Melick, et al, incorporated herein by reference and also, in part, in U.S. Pat. No. 6,236,652 to Preston et al. These references provide for conversion of geo-spatial coordinates, such as latitude/longitude, to an addressing scheme (GeoIP) for communication packet routing that supports current TCP/IP (IPv4) and future addressing (IPv6) requirements. GeoIP is an instantaneous addressing system based on the location of a sender in relationship to the geo-coordinates of the recipient. Currently, computers route telephone calls and telecommunication packets using cell locations, IP addresses, referencing look-up tables and utilizing complicated mathematics.

Currently, IP addresses are numbers assigned by the network which would simply be replaced by a geographic position coordinate (X, Y, Z) or (Latitude, Longitude, Altitude). Such geographic positions may be constantly changing, and therefore the GeoIP address of the device connected to the network is constantly changing. These changes are accommodated by reporting the current position to a telecommunication network, in the same manner as is currently done in the cellular phone industry.

Preston et al. depends on GPS for latitude/longitude information. Melick et al. previously mentioned, uses GPS, UWB, other radio-based location systems, and/or electronic map GIS data to create a seamless, global reference for all fixed and mobile transmission and receiving devices. By using geoposition data as an instantaneous routing header, telecommunication switches will simply compare the location of the sender, the receiver, and the associated nodes to mathematically self-route packets through the network. GeoIP will greatly reduce the complexity associated with network switching and routing, and also dramatically reduces "time on network" for a data packet.

The Preston et al. patent and the Melick et al. patent application previously mentioned, describe only methods to route telecommunications, however, they do not combine the routing function for use as instantaneous geo-spatial alias for use in a unified messaging system. Also, neither reference uses a software utility on a stationary device, such as a desktop PC, as a self-provisioning feature that uses basic physical addresses and zip code information to create a GeoIP address.

Software utilities, such as Microsoft Passport, an electronic wallet initiative for completing on-line transactions, contain the basic demographic and personal information used for unified messaging as described in the Ranalli and Hamilton, but require a specific e-mail address to enable communication. In addition, Microsoft Passport does not use references to geo-spatial coordinates, such as latitude, longitude, time, or a combination of these, as unique identifiers In addition to common top level domain names such as .com, .org, .gov, there are country codes such as us for the United States, .uk for the United Kingdom, etc., which are high-level geographic references, but do not provide enough granularity to deliver and concatenate messages for a specific user.

There is therefore a need for creating a unified messaging system that addresses the shortcomings described above, and uses any available demographic and/or personal information relating to a person, business, or enterprise, as unique identifiers, which are referenced to geo-spatial coordinates.

FEATURES OF THE INVENTION

A general feature of the present invention is the provision of a unified messaging system using messaging aliases, which overcome the problems found in the prior art.

Another feature of the present invention is the provision of a method for creating messaging aliases, which are referenced to geo-spatial coordinates.

Yet another feature of the present invention is the provision of a user and system interface to control access and usage of the unified messaging system.

A further feature of the present invention is the use of a unified messaging system by all levels of government to maintain contact with the citizens within their jurisdiction.

Another feature of the present invention is the use of a unified messaging system to route electronic messages to a public server to be printed on-demand in order to be delivered in a hardcopy format.

Yet another feature of the present invention is the provision of a method for users to access the unified messaging system using a personal identification number (PIN).

A further feature of the present invention is the provision of a method for users to access a unified messaging system interface in order to set filters to control which individuals, businesses, enterprise, and government agencies may have messaging rights.

A still further feature of the present invention is the provision of a user interface which is calendar based for the purpose of controlling message deliveries at a specific time and date, and also for the use of sending messages on a scheduled basis.

Another feature of the present invention is the provision of an operating platform which is based on DataSpace, Linear Database, and XML routing technologies.

A further feature of the present invention is the provision of a software utility for client devices to provide geo-spatial coordinates based on street address.

These, as well as other features and advantages of the present invention will become apparent from the following specification and claims.

SUMMARY OF THE INVENTION

The present invention is a method and apparatus for enabling and simplifying communication between users over a switched and/or packet network. The preferred embodiment of the present invention provides a relational database which is accessible through the global telecommunication's network. The database uses demographic e-mail aliases based on information such as, but not limited to, street address, city, and zip code for specific users, which are related to universal geographical coordinates and to data network address(es) and/or PSTN telephone number(s) by which the user may be reached. The present invention's database can also relate affinity flags to a specific user, and to a data network address and/or PSTN telephone number by which the user may be reached. The database can also use calendar and/or location flags when compared to universal geographical coordinates associated with a specific user. The unique identifiers, and/or optional affinity flags, and/or optional calendar, and/or location flags provided by a user, are made readily available by the present invention's database to those desiring to communicate with another user.

According to one aspect of the present invention, a method is provided for registering a user's unique identifiers, and/or affinity flags, and/or calendar and/or locations flags, to their associated Internet address(es) using the present invention's database that is accessible on the Internet. This database may also serve as a directory service with user controls over affinity flags, and/or calendar and/or locations flags.

According to another aspect of the present invention, a public e-mail address can be related to a specific user. The DS can be accessed with a request for the resolution of unique identifiers, and/or affinity flags, and/or calendar and/or locations flags, associated to a user's Internet address, and related universal geographical coordinates.

According to another aspect of the present invention, stationary client devices, assets, and network hardware connected to the network can provide geo-spatial information as a self-provisioning feature using a software utility that uses telephone numbers and/or basic demographic information.

According to yet another aspect of the present invention, a cable TV set-top box, enhanced line interface device, etc., serves as a local e-mail server and known public address for receiving electronic messages.

In an alternative embodiment of the present invention a method and apparatus is provided for using two emerging technologies described in U.S. patent application Ser. No. 09/698,793 to Melick, et al, as known as Linear Databases, incorporated herein by reference, and U.S. patent application Ser. No. 10/345,766, entitled METHOD AND SYSTEM FOR STORING DATA ON TRANSMISSION MEDIUMS to Melick, et al, also known as DataSpace, both of which are incorporated herein by reference. These emerging technologies will radically improve the speed of access to data, and its searchability by globally distributing the present invention's database and DS directly on the packet network infrastructure. In this embodiment of the present invention, data is stored in structured, or semi-structured network data packets 'reverberating' on the network infrastructure, which is acting as an enormous RAM disk. By keeping data in motion on the network, multiple gigabits or even terabits of data can be scanned every second by thousands of users.

Reference to the remaining portions of the specification, including the drawings and claims, will realize other features and advantages of the present invention. Further features and advantages of the present invention, as well as the structure and operation of various embodiments, are described in detail below with respect to the accompanying drawings. In the drawings, like reference numbers indicate identical or functionally similar elements.

DETAILED DESCRIPTION OF AN EXEMPLARY EMBODIMENT

The present invention is a method and apparatus for enabling and simplifying communication between users over a switched and/or packet network. The preferred embodiment of the present invention provides a relational database which is accessible through the global telecommunication's network. The database uses demographic e-mail aliases based on information such as, but not limited to, street address, city, and zip code for specific users, which are related to universal geographical coordinates, and to a universal geographical coordinate, to a specific user, and to data network address(es) and/or PSTN telephone number(s) by which users may be reached. The present invention's database can also relate affinity flags to a specific user, and to a data network address and/or PSTN telephone number by which the user may be reached. The database can also use calendar and/or location flags when compared to universal geographical coordinates associated with a specific user. The unique identifiers, and/or optional affinity flags, and/or optional calendar, and/or location flags provided by a user, are made readily available by the present invention's database to those desiring to communicate with another user.

Figure 1:
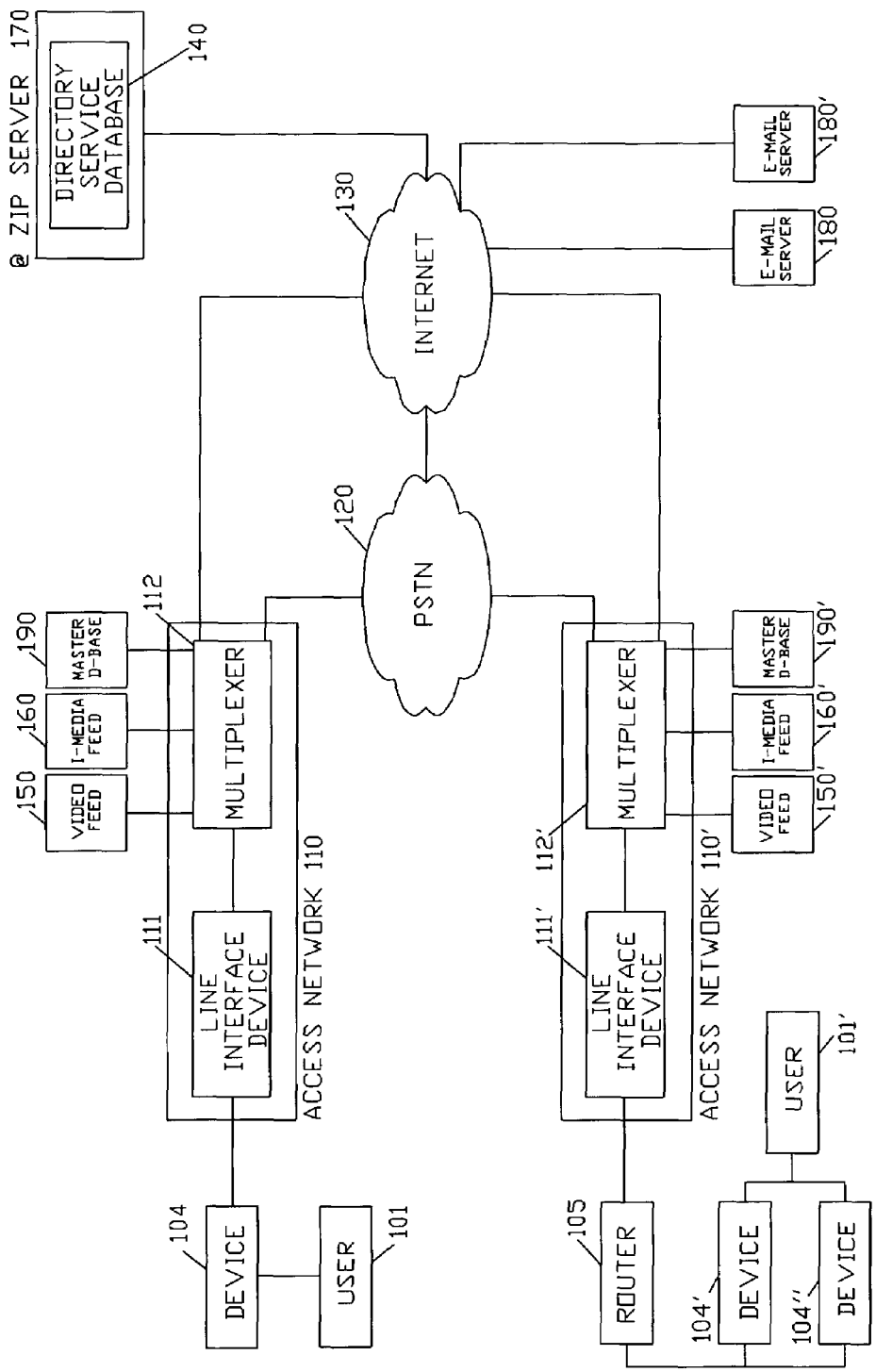
FIG. 1 illustrates an overall architecture of the preferred embodiment of the present invention in which the Directory Service Database (DSD) resides on a traditional relational database.
Figure 2:
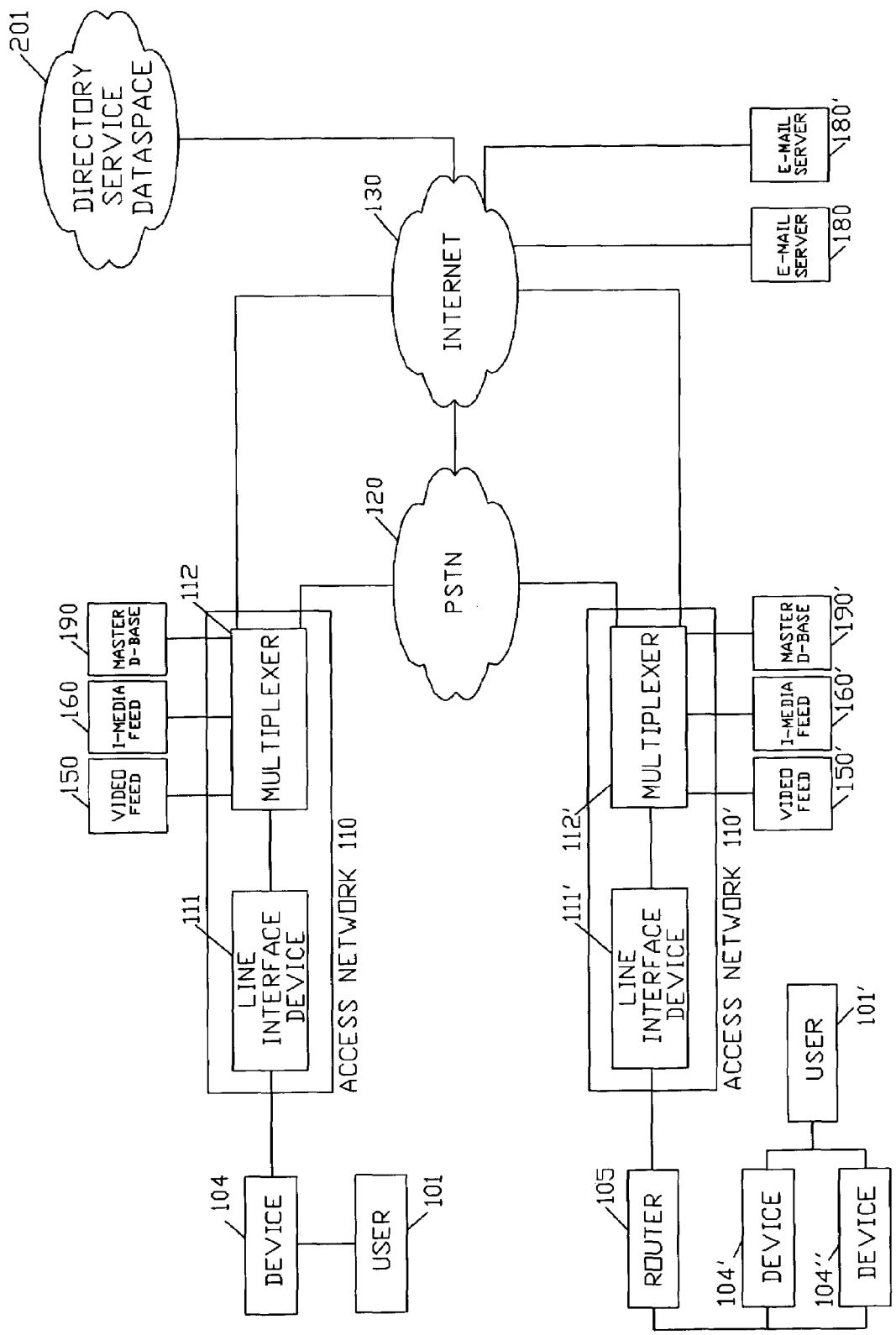
FIG. 2 illustrates an overall architecture of an alternative embodiment of the present invention in which the Directory Service DataSpace (DSDS) resides directly on the network in a DataSpace.

Telephone numbers converted to e-mail aliases are well known in the art and are useful in the present invention. However, the present invention provides another method for creating unique, public e-mail address aliases using readily available demographic information available in a variety of databases which relate to a specific user 101, 101' as shown in FIG. 1 and FIG. 2.

E-mail addressing is well known in the art. Each user 101, 101' as shown in FIG. 1 and FIG. 2 may have one, or more unique e-mail address. Just like the full address of a house, an e-mail address tells everyone the exact location they can use to send messages to you. The generic structure of these addresses is as follows:

[username@domain name.top level domain]

Most user names are a single word representing the person's first or last name, or a combination of the two names. Some user names may be both the first name and last name separated by a period (for example, dave.snyder). Some e-mail systems may use different conventions. CompuServe, for example, uses two numbers separated by a period. The symbol "@" separates the "who" part of the address (the part to the left of the @ sign) and the "where" part (the part to the right of the @ sign). The domain name is the Internet name of the user 101, 101' as shown in FIG. 1 and FIG. 2. It tells where on the network the user's e-mail is located. The domain name may also have sub-domain names associated with it to further identify individual networks with a domain. The domain suffix indicates what type of organization you're classified as. The well known suffixes are .com for a commercial business, .edu for an educational institution, .gov for government agencies, .mil for the military, .net for a networking organization, and .org for a non-profit organization. Recently, these well known suffixes have been expanded to include .biz, .info, .name, .pro, .aero, .coop, and .museum. The domain name and domain suffix are separated by a period.

Alternatively, to the well known list and expanded list above, many newer e-mail addresses forego the old "type" domain suffix designations in favor of geographical domains, i.e. a domain suffix may be "ca" for Canada, or "us" for the Unites States, etc.

Once an e-mail message is created and sent by a user 101, 101' (not shown), it is routed to a special e-mail computer on the user's network as shown in FIG. 1 and FIG. 2, or on a access provider's network, wraps the message in an electronic "envelope" that has, like a regular envelope, the address of user 101, 101' as shown in FIG. 1 and FIG. 2, who is being messaged, and the address of the user 101, 101' as shown in FIG. 1 and FIG. 2, who is originating the message. The Internet mechanism for e-mail is called SMTP (Simple Mail Transport Protocol), which is part of the Transport Control Protocol/Internet Protocol (TCP/IP) family. The provider's computer that handles outgoing mail is called an SMTP server.

Because there will only rarely be a direct connection between the user's 101, 101' as shown in FIG. 1 and FIG. 2, the e-mail will make a number of stops at intermediate networks along the way. At each stop, another e-mail computer temporarily stores the message while it determines the best way to relay the message toward its ultimate destination. Once completed, the message is forwarded, and the entire process repeats at the next node in the network.

Eventually, the message is delivered to the user's 101, 101' as shown in FIG. 1 and FIG. 2 network who is being messaged, where an e-mail computer routes it to the user's 101, 101' as shown in FIG. 1 and FIG. 2 e-mail box. If the user 101, 101' as shown in FIG. 1 and FIG. 2, who is being messaged, uses a networked e-mail program that doesn't understand a particular e-mail format, such as Microsoft Mail or cc:Mail, the e-mail message will have to go through another computer, known as a gateway, that converts the message into something the program can decode.

When an access provider is used to access the Internet, there's no direct way to get an e-mail message onto an end-user's 101, 101' as shown in FIG. 1 and FIG. 2 computer, because they're not connected to a network full-time. To solve this problem, an access provider sets up a special account for a user 101, 101' as shown in FIG. 1 and FIG. 2. This is called a Post Office Protocol (POP) account, and uses a POP server. POP essentially turns the server into the electronic equivalent of a post office. When a user 101 generates a message to another user's 101' e-mail address, the messages are stored in a special mailbox specific to the user 101', who is being messaged. The user 101' who is being messaged, can use an e-mail program, such as but not limited to, Windows Messaging, Outlook Express, Outlook, or the Mail component of Netscape Communicator to log into their POP account, access the messages, store them on their computer, and then empty their e-mail box.

The public e-mail system routes messages using specified e-mail addresses, in much the same way that the United States Postal Service (USPS) uses the address on an envelope or a package, to locate the user 101. This aspect of the present invention creates a common, public e-mail address format that can use readily available, demographic information to address and route e-mail. The present invention may use the e-mail system described above as a stand-alone system, or in conjunction with a network designed to serve as a geographically-based routing system in which the Central Office of a telephony network, the Head End of a cable TV network, intermediate field electronics, wireless points of presence (POP), and end users are geographically referenced.

In addition, postal zip codes are easily related to geo-spatial information that can become geo-spatial keys in DSD 140 as shown in FIG. 1, or DSDS 201 as shown in FIG. 2. As an example, a person's first name, last name, and street address are used as a user name in conjunction with their zip code used as a domain name to create a unique combination of information fields for unified messaging.

The term "zip code" is used to describe postal and or zip codes of various types. The following are examples of a format for public e-mail addresses which use a five digit zip code as the domain name:

[First Name.Last Name.Suffix.House No.Street.Street Type.Direction@Zip Code Domain.Top Level Domain]

[Dave.Snyder.Jr.5207.Broadlawn.Dr.SE@52403.com]

[First Initial.Last Name.Suffix.House No.Street.Street Type.Direction@Zip Code Domain.Top Level Domain]

[D.Snyder.Sr.5207.Broadlawn.Dr.SE@52403.com]

The following is an example of a common format, public e-mail addresses which uses an 11 digit zip code as the sub-domain and domain name:

[First Initial.Last Name.Suffix@Zip Code 6 Digit Extension Sub-Domain.Zip Code Domain.Top Level Domain]

[D.Snyder.Jr@123456.52403.com]

Often, business e-mail addresses are difficult to predict. The following is an example of a common format, public e-mail address which uses an 11 digit zip code as the domain name, for a specific person who is employed at a specific business:

[First Initial.Last Name.Suffix.Company Name@Zip Code.6 Digit Extension Sub-Domain.Zip Code Domain.Top Level Domain]

[D.Snyder.Jr.DLBLimited@123456.52402.com]

Other formats could be expanded to include a 19 digit zip code, or other common physical mail identifiers, such as but not limited to, mail stops, room numbers in a motel or dormitory, suite numbers, country code, etc.

Although .com is used in the previous examples, any top level domain name can be used.

As the @Zip method uses standard e-mail and instant message address formats, a DNS server is used to resolve zip code domain names to a specific cable TV network operator in order to properly route @Zip e-mails, or instant messages. The @Zip methodology includes a zip identifier in the address.

Figure 3:
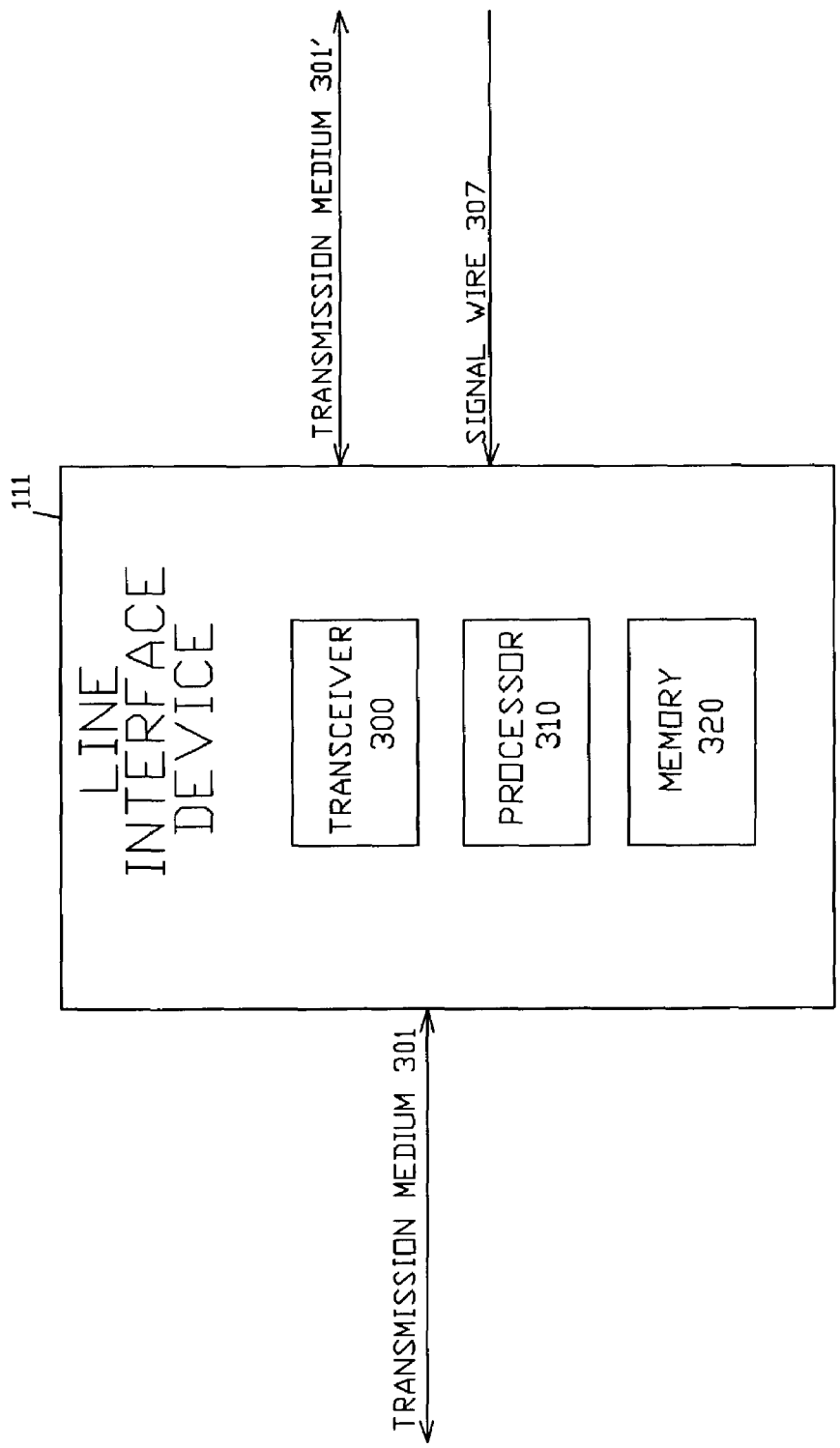
FIG. 3 illustrates a block diagram of a line interface device.

This aspect of the present invention (hereinafter referred to as @Zip) provides a method by which a person will have a public e-mail address that is meaningful, particularly when used in conjunction with a network such as, but not limited to, a Cable TV network, PSTN network, LAN, etc. as a delivery mechanism. The @Zip e-mail address format allows anyone residing, or working, at a specific street address to receive e-mails directed to them through a @Zip e-mail server, or next generation intelligent network line interface device as shown in FIG. 3.

As the relevant demographic information to create an @Zip e-mail address for a specific user 101, 101' as shown in FIG. 1 and FIG. 2 is usually maintained in almost any database created by any private or public organization, one skilled in the art can see that it would be easy to write software as necessary for a computer or an appliance that would automatically create an @Zip e-mail address.

Various agencies and levels of government would use the demographic information in their own databases to create an @Zip e-mail address to send Social Security updates, IRS notifications, tax bills, etc.

Public schools can use the demographic information in their own databases to create a @Zip e-mail address to forward student grades and notes to the parent's @Zip e-mail address.

The @Zip e-mail address can be used in conjunction with the web-based interface for DSD 140 as shown in FIG. 1, where a user 101, 101' as shown in FIG. 1 and FIG. 2 sets filters which allow certain private users 101, 101' as shown in FIG. 1 and FIG. 2 to send them e-mail. As an example, a user

101, 101' as shown in FIG. 1 and FIG. 2 can allow their church, or other organization to which they belong to, use the @Zip e-mail address as a point of contact to receive meeting reminders, or newsletters.

Users 101, 101' as shown in FIG. 1 and FIG. 2 are frequently asked for their telephone number at a retail outlet in order for certain demographic information about a user 101 to be captured in order to enhance and manage the user's 101, 101' relationship with the store. A user 101, 101' can allow a retail store such as Sears, as an example, to use their @Zip e-mail address to forward copies of warranties for various durable goods, or specially directed advertising without giving their private e-mail address.

@Zip used in conjunction with DSD 140 as shown in FIG. 1, provides a built-in calendar driven functionality which can be used to create and send regularly occurring meeting reminders, etc., or to cause e-mails, or regular mail to be delivered on a specific date.

Alternatively, various government agencies, advertisers, or other organizations could use the @Zip e-mail server in a hybrid system. This approach of combining e-mail on the front-end with print on-demand at a courier's location, such as but not limited to, United Parcel Service (UPS), USPS, Federal Express (FedEX), Airborne, can save considerable physical resources which are now required to carry various forms of hardcopy throughout the entirety of a delivery system.

As an example, UPS can publish a daily list of @Zip physical addresses on DSD 140 as shown in FIG. 1, or DSDS 201 as shown in FIG. 2, they will be delivering packages to the next day. Office Max could compare the UPS daily list to their customer list for a specific Zip Code and send an e-mail detailing highly directed advertising to their customers via the local UPS office, which would print the e-mail advertising on-demand and deliver it to the common customer that day.

The USPS Delivery Point Code (DPC) is a geographic hierarchical numbering system of six distinct levels out to a 19 digit zip code, which is required to create a unique housing or business unit identifier for multiple unit buildings or equivalents, such as mobile home parks, or firms receiving large volumes of mail. There are many software programs available today to convert any level of USPS zip code to latitude and longitude. The demographic information associated with a specific user 101, 101' as shown in FIG. 1 and FIG. 2 is publicly available, as opposed to telephone company records.

The benefits of using a zip code as a domain name, and/or geographic suffix, and or other relevant part of an e-mail address are:
1. The USPS provides monthly updates to all postal files.
2. There are very economically priced commercial tools, such as Group 1 and Mailer's Software, that address, standardize and assign 11 digit Zip codes to files containing raw addresses.
3. Adding the remaining eight digit code to create a 19 digit Zip Code is an easy process for records that require a secondary address to create a unique housing or business unit identifier.
4. There are no restrictions on using an extended USPS Zip Code outside the regulated telecommunications network because it is not considered customer provided network information.
5. There is a major public safety initiative to change as many RR Box number addresses to street addresses as possible, thus increasing number of users who could be reached using a common format, public e-mail address.
6. The USPS zip code is easily related to latitude/longitude information which can provide a geo-spatial key for data records in DSD 140 as shown in FIG. 1, or DSDS 201 as shown in FIG. 2 of the various embodiments of the present invention.

@Zip overcomes the limitations of e-mail addresses which have little significance, other than a link to a company or organization name. The @Zip format will allow the linking of the digital information world to the world of hardcopy delivery. As extensive databases already exist with a person's name, street, city, and zip code which are often linked to telephone numbers, the ability to easily create @Zip e-mail addresses is a relatively simple programming matter. The @Zip format will allow highly directed materials to be created, printed on-demand at distribution locations, and distributed through widely dispersed, strategically located services. The @Zip format becomes a powerful self-provisioning feature for converting zip codes to geo-spatial keys in DSD 140 as shown in FIG. 1, or DSDS 201 as shown in FIG. 2.

In addition, peer-to-peer instant messaging programs, such as but not limited to, AOL Instant Messenger™, Yahoo! Messenger, ICQ, Jabber, Microsoft Windows Messenger, etc., can use @Zip format addresses.

In addition, e-mail software, such as but not limited to Microsoft's Outlook, Qualcomm's Eudora Mail, or Sun Microsystems's StarOffice Mail, also contain or integrate with contact databases that can contain telephone numbers, and demographic information related to a specific user 101, 101' as shown in FIG. 1 and FIG. 2. One can see how these software applications could easily be modified to create @Zip e-mail addresses based on phone number or address, for the purpose of routing messages, without a priori knowledge of a random or cryptic e-mail address, to a cable TV network, or next generation intelligent network cable TV, or telephony network as shown in FIG. 3 for delivery to a user 101, 101' as shown in FIG. 1 and FIG. 2.

Another feature of the present invention provides for the routing, filtering and processing of data and messages solely based upon geographical information or in combination with geographic information and other informational elements, for example, time of day. Currently, much of the data routed on public and private networks is performed at the third layer of the OSI model. This is accomplished by using a network packet's address, such as, IP-based 32 bit address, in combination with routers, routing tables, network routing rules to route a network packet to its destination address.

When routing, filtering, or processing data based upon geography, a logical understanding of a network is not required. A geographic address could be represented in a common format shared with Global Positioning System (GPS): time, longitude, latitude, and altitude. Network components can contain GPS receivers, or their geographic location information could be provided via several methods including, but not limited to manual entry and use of a client-server method to a system providing geographic location information. In addition, GPS provides for a unique combination of location and time so that multiple devices located in a similar location would have unique GPS addresses. Other methods of creating unique addresses for components located in a similar location can include the use of other elements such as network addresses, processor identifiers, MAC addresses, device serial numbers, etc.

U.S. patent application Ser. No. 10/345,766, entitled METHOD AND SYSTEM STORING DATA ON TRANSMISSION MEDIUMS to Melick, et al, previously incorporated describes the Lightwaves Data Link (LDL) adapted for use on a Dataspace. LDL adapted for Dataspace has the ability to store geographical data in addition to other relevant information elements within a private area associated with the data contained within the LDL data payload areas. As a result, methods and systems are available to process, route, filter, and perform other actions on LDL messages and the data contained within the LDL frame.

One method includes the use of Extensible Markup Language (XML), XML routing, LDL, and navigational systems including, but not limited to Long Range Navigation (LO-RAN) and GPS. XML has become a popular method for embedding META information within data, and in particular, as a method to improve information transfers among entities. Simply, META data is information about information. For example, META data included with an inventory of widgets represented in XML can include the date and time the XML widget inventory file was created, system or author responsible for the generation of the widget information, and the processing rules for widget inventory, etc.

This feature of the present invention can be implemented by using XML to include geographic and time based META data for routing, filtering, and processing purposes. Instead of network routers performing routing and filtering operations at the network layer, the routing of data would occur at a higher level, and routed based upon the content stored within the constructs of an XML stream. Sarvega manufactures routers that route data based on XML information. Combining the XML routing concept currently offered by Sarvega in combination with the geographic data as provided for in the present invention, a simple routing mechanism can be created based upon geographic routing rules and geographic data contained within the XML data.

Geo-spatial keys are important for random, non-geographic IP addresses, but are also important as a method to implement a geographically-based, self-routing telecommunication system. The @Zip feature of the present invention is powerful in that it can be implemented without the expense of building a DSD 140 as shown in FIG. 1, and/or DSDS 201, when @Zip servers 170 as shown in FIG. 1 are set-up and maintained, much like DNS servers, to link zip code information to cable TV, and next generation intelligent network providers. The total capabilities of the present invention, however, are further enhanced with the construction of a DSD 140 as shown in FIG. 1, and/or DSDS 201.

FIG. 1 represents the preferred embodiment of the present invention, in which two users 101, 101' are connected via access networks 110, 110'.

Access Networks 110, 110' may be configured as Cable TV, PSTN, LAN, etc., and can be used for messaging users 101, 101' and/or devices 104, 104', 104" which are connected to one of these types of networks. Devices 104, 104', 104" may be devices such as, but not limited to, PCs, TVs, set-top boxes, Internet appliances, e-mail stations, telephones, etc. Devices 104', 104" are shown connected to a router 105 which is connected to Access Network 110'. As an example, router 105 can be of the type included in a LINKSYS "Estherfast 10/100 Network In A Box", product number FENSK05. One advantage of Cable TV and PSTN networks relating to the present invention is that each network operator maintains a current master database, which typically contains information including but not limited to name, street address, city, state, zip code, telephone number, account number, etc, of users 101, 101'. This demographic information is used to form a @Zip address to message a user 101, 101' without a priori knowledge of random and/or cryptic e-mail, or instant message address.

At a minimum, access networks 110, 110' are typically configured with a multiplexer 112, 112' and line interface device 111, 111'. The line interface device 111, 111' may be configured as a stand-alone modem or codec, within a PCM-CIA card, or integrated into devices 104, 104', 104" such as, but not limited to, TVs, PCs, PDAs, tablets, telephones, set-top boxes, etc.

The multiplexer 112, 112' is located at the Central Office, or Digital Loop Carrier of a telephony network, or the Head-End, or intermediate node of a Cable TV network. The multiplexer 112, 112' is capable of receiving analog and digital signals including, but not limited to video feed 150, 150', Internet traffic 130 including e-mail from e-mail servers 180, 180', interactive media (I-Media) feed 160, 160', voice feed from the PSTN 120, etc. The video feed 150, 150' is programmed TV. The I-Media feed 160, 160' may be services such as, but not limited to, time slot TV (TiVo), pay-per-view programming, video-on-demand, or systems based on a form of the Extensible Markup Language, (XML). XML-based I-Media include feeds created with software such as, but not limited to, GoldPocket Interactive's EventMatrix suite, which includes EM Composer, EM Network, EM TechDirector, EM Player, etc. Video feed 150, 150' and I-Media feed 160, 160' may originate sources such as, but not limited to, video servers, satellite feeds, feeds from a DataSpace, etc. The multiplexed signal from multiplexer 112, 112' may be transmitted over a variety of transmission medium, including but not limited to, coaxial cable, fiber optic cable, twisted pair, plastic fiber cable, airwaves, or a combination of these.

The preferred embodiment of the present invention provides an @Zip server 170 which contains a Directory Service Database 140 (DSD) which enables unified messaging. The DSD 140 is accessible via the Internet 130. @Zip server 170 can be a collection of one or more servers, computers, etc. that are able to provide functionality for the present invention. @Zip server 170 can include multiple similar and distinct hardware components or models, such as but not limited to Dell, IBM, Sun, HP and required operating system software such as but not limited to Unix, Microsoft Windows, RedHad Linux and other required supportive operating systems. In addition, @Zip server 170 can include a multitude of supporting software components required to support the implementation of the present invention including, but not limited to Apache Web Server software, Microsoft IIS Web Server Software, Oracle, MySQL, Lightweight Directory Access Protocol (LDAP), Application engines, Voice recognition software, Voice application engines, CORBA software and middleware. DSD 140 represents the storage of data including software required to run @Zip server 170 and provide functionality for the present invention. DSD 140 can be attached to @Zip server 170 via network transport or bus connections including, but not limited to Small Computer Systems Interface (SCSI), Internet SCSI (iSCSI), Periperal Component Interconnect (PCI), Fiber optic transport, Fiber Channel, TCP/IP, and SNA. In addition, DSD 140 can be a collection of one or more media storage units that are located locally or remotely to @Zip server 170. DSD 140 can include, but is not limited to magnetic and optical media storage.

In particular, the DSD 140 relates a user 101, 101' to geo-spatial keys based on address. In addition, a user 101, 101' may be related to other personal information, and/or affinity flags, and/or location flags, and/or time and date flags to create universal identifiers which can be used as messaging aliases, and filters for the purpose of routing and delivering messages to a specific user 101, 101'.

The preferred embodiment of the present invention routes messages in various forms, such as but not limited to, e-mails, voice mails, videos, faxes, text-based pages, instant messages, etc, based on @Zip addresses. These messages may be originated by a user 101, 101' in forms, such as but not limited to, an e-mail, instant messages, a text-based page, voice input, video input, etc. These messages may be delivered to devices or equipment, such as but not limited to, landline phones, cell phones, voice mail boxes, computers, pagers, faxes, interactive TVs, set-top boxes, Automatic Teller Machines (ATMs), personal digital assistants (PDAs), digital radios and radio frequency identification tags (RFID). They may also be delivered to vehicles with integrated telecommunication and positioning capabilities, such as but not limited to, General Motors' OnStar system used primarily in a user's 101, 101' personal vehicle, or Qualcomm's OmniTRAC system used by over-the-road trucks.

The user 101, 101' may send messages using communication system interfaces 111, 111', such as, IP enabled PBX systems, IP enabled Centrex systems, IP enabled Central Office systems, IP enabled telephones, IP enabled cell phones, IP enabled voice mail systems, and IP enabled fax machines, PSTN, etc.

DSD 140 can be implemented in a wide variety of ways. The DSD 140 can be configured to run software, such as but not limited to, Sun Cluster 2.1 on hardware, such as but not limited to, a group of Sun Enterprise 4500 computer servers using redundant array of independent discs (RAID) based storage devices, which are available from Sun Microsystems, Inc. The DSD 140 is configured to use a variety of Internet services, such as, but not limited to, Domain Name System (DNS), Lightweight Directory Access Protocol (LDAP), and HyperText Transfer Protocol (HTTP) software. These systems and associated software may be housed in an Internet Data Center equipped with fully redundant subsystems, such as multiple fiber trunks coming from multiple sources, redundant power supplies, and backup power generators. The DSD 140 site may also utilize firewall technology to securely protect the information stored in the DSD 140. Such systems are commonly used in applications such as those described in the preferred embodiment of the present invention.

The DSD 140 can be accessed by a specific user 101, 101' through the Internet 130 to add, modify, and delete unique identifiers, other than their telephone number(s) and demographic information. The user 101, 101' can access DSD 140 through an Internet interface 130 to add, modify, and delete affinity flags, such as but not limited to, favorite sports teams, favorite colleges, colleges and schools attended, military branch and unit served in, civic groups they belong to such as Rotary International, Kiwanis International, Lions Club International, religious groups they belong to, committees they serve on as part of an organization, and/or time and date calendar flags, and/or location flags. As an example of the use of affinity flags, user 101, 101' can set an affinity flag to indicate they are a fan of the Pittsburgh Steelers professional football team. This information can be aggregated and distributed, with the user's permission, to various Steelers fan clubs, the Steeler organization, etc., so they may be contacted with special offers for merchandise, newsletters, etc. Similarly, if a user 101, 100' registers their church with an affinity flag in the DSD 140, the church can contact the user 101, 101' with a reminder e-mail or voicemail about an upcoming committee meeting. If the user 101, 101' sets a calendar flag for a specific time period they will be out of town, the DSD 140 could automatically notify the user 101, 101' originating the message, of the unavailability of the user 101, 101' that is being messaged. Similarly, the user 101, 101' can choose to set a location flag related to a calendar flag to control messaging based on time, date, and location. As an example, a user 101, 101' using a wireless device, such as but not limited to, a cell phone, PDA, laptop can have their wireless network operator check the DSD 140 periodically to compare the current geographical location of the user 101, 101' to location flags in the DSD 140 and forward or block messages according the user's 101, 101 messaging preferences.

In another example, the DSD 140 can be accessed by a government agency to send messages to individuals or organizations, using unique identifiers related to the user 101, 101'. As an example, the IRS database contains a social security number as the primary key field related to a specific user 101, 101'. If the DSD 140 list of unique identifiers includes a social security number, the IRS can forward messages such as an e-mail to the user 101, 101' to notify them of a tax refund. This becomes particularly beneficial when a unified messaging system is capable of creating and routing electronic messages, particularly e-mails, to users 101, 101' without a priori knowledge of their e-mail address.

FIG. 2 depicts an alternate embodiment of the present invention. In this embodiment a method and apparatus is provided for using a Directory Service DataSpace 201 (previously referenced) instead of a Directory Service Database 140 running on an @Zip server 170 as shown in FIG. 1. The present invention relates generally to storing/caching data directly on transmission mediums and network transmission hardware. A DataSpace is a system and method for searching, accessing, querying, and performing computations of locally or globally distributed data, that is stored and/or cached in the form of data packets, protocol data units (PDU), or protocol payloads, etc., continuously transmitted on a telecommunication network, microprocessor, data bus, or electronic circuit.

In this alternate embodiment of the present invention, two users 101, 101' are connected via access networks 110, 110'. Access Networks 110, 110' may be configured as Cable TV, PSTN, LAN, etc., and can be used for messaging users 101, 101' and/or devices 104, 104', 104" which are connected to one of these types of networks. Devices 104, 104', 104" may be devices such as, but not limited to, PCs, TVs, set-top boxes, Internet appliances, e-mail stations, telephones, etc. Devices 104', 104" are shown connected to a router 105 which is connected to Access Network 110'. As an example, router 105 can be of the type included in a LINKSYS "Etherfast 10/100 Network In A Box", product number FENSK05. One advantage of Cable TV and PSTN networks relating to the present invention is that each network operator maintains a current master database, which typically contains information including but not limited to name, street address, city, state, zip code, telephone number, account number, etc, of users 101, 101'. This demographic information is used to form a @Zip address to message a user 101, 101' without a priori knowledge of random and/or cryptic e-mail, or instant message address.

At a minimum, access networks 110, 110' are typically configured with a multiplexer 112, 112' and a line interface device 111, 111'. The line interface device 111, 111' may be configured as a stand-alone modem or codec, within a PCM-CIA card, or integrated into devices 104, 104', 104" such as, but not limited to, TVs, PCs, PDAs, tablets, telephones, set-top boxes, etc.

The multiplexer 112, 112' is located at the Central Office, or Digital Loop Carrier of a telephony network, or the Head-End, or intermediate node of a Cable TV network. The multiplexer 112, 112' is capable of receiving analog and digital signals including, but not limited to video feed 150, 150', Internet traffic 130 including e-mail traffic from e-mail servers 180, 180', interactive media (I-Media) feed 160, 160', voice feed from the PSTN 120, etc. The video feed 150, 150' is programmed TV. The I-Media feed 160, 160' may be services such as, but not limited to, time slot TV (TiVo), pay-per-view programming, video-on-demand, or systems based on a form of the Extensible Markup Language, (XML). XML-based I-Media include feeds created with software such as, but not limited to, GoldPocket Interactive's Event-Matrix suite, which includes EM Composer, EM Network, EM TechDirector, EM Player, etc. Video feed 150, 150' and I-Media feed 160, 160' may originate sources such as, but not limited to, video servers, satellite feeds, feeds from a DataSpace, etc. The multiplexed signal from multiplexer 112, 112' may be transmitted over a variety of transmission medium, including but not limited to, coaxial cable, fiber optic cable, twisted pair, plastic fiber cable, airwaves, or a combination of these.

This embodiment of the present invention provides a DataSpace configured to operate a Directory Service DataSpace (DSDS) 201 which enables unified messaging. The DSDS 201 as shown in FIG. 2 is accessed via the Internet 130, but may be accessed directly.

In particular, the DSDS 201 relates a user 101, 101' to geo-spatial keys based on address. In addition, a user 101, 101' may be related to other personal information, and/or affinity flags, and/or location flags, and/or time and date flags to create universal identifiers which can be used as messaging aliases, and filters for the purpose of routing and delivering messages to a specific user 101, 101'.

The preferred embodiment of the present invention routes messages in various forms, such as but not limited to, e-mails, voice mails, videos, faxes, text-based pages, instant messages, etc., based on @Zip addresses. These messages can be originated by a user 101, 101' in forms, such as but not limited to, an e-mail, instant messages, a text-based page, voice input, video input, etc. These messages can be delivered to devices or equipment, such as but not limited to, landline phones, cell phones, voice mail boxes, computers, pagers, faxes, interactive TVs, set-top boxes, Automatic Teller Machines (ATMs), personal digital assistants (PDAs), digital radios and radio frequency identification tags (RFID). They may also be delivered to vehicles with integrated telecommunication and positioning capabilities, such as but not limited to, General Motors' OnStar system used primarily in a user's 101, 101' personal vehicle, or Qualcomm's OmniTRAC system used by over-the-road trucks.

The user 101, 101' can send messages using communication system interfaces 111, 111', such as, IP enabled PBX systems, IP enabled Centrex systems, IP enabled Central Office systems, IP enabled telephones, IP enabled cell phones, IP enabled voice mail systems, and IP enabled fax machines, PSTN, etc.

The DSDS 201 can be accessed by a specific user 101, 101' through the Internet 130 as shown, or directly, to add, modify, and delete unique identifiers, other than their telephone number(s) and demographic information. The user 101, 101' can access DSDS 201 through an Internet interface 130 as shown to add, modify, and delete affinity flags, such as but not limited to, favorite sports teams, favorite colleges, colleges and schools attended, military branch and unit served in, civic groups they belong to such as Rotary International, Kiwanis International, Lions Club International, religious groups they belong to, committees they serve on as part of an organization, and/or time and date calendar flags, and/or location flags. As an example of the use of affinity flags, a user 101, 101' can set an affinity flag to indicate they are a fan of the Pittsburgh Steelers professional football team. This information can be aggregated and distributed, with the user's permission, to various Steelers fan clubs, the Steeler organization, etc., so they may be contacted with special offers for merchandise, newsletters, etc. Similarly, if a user 101, 100' registered their church with an affinity flag in the DSDS 201, the church can contact the user 101, 101' with a reminder e-mail or voicemail about an upcoming committee meeting. If the user 101, 101' sets a calendar flag for a specific time period they will be out of town, the DSDS 201 would automatically notify the user 101, 101' originating the message, of the unavailability of the user 101, 101' that is being messaged. Similarly, the user 101, 101' can choose to set a location flag related to a calendar flag to control messaging based on time, date, and location. As an example, a user 101, 101' using a wireless device, such as but not limited to, a cell phone, PDA, laptop could have their wireless network operator check DSDS 201 periodically to compare the current geographical location of the user 101, 101' to location flags in DSDS 201 and forward or block messages according the user's 101, 101 messaging preferences.

In another example, DSDS 201 can be accessed by a government agency to send messages to individuals or organizations, using unique identifiers related to the user 101, 101'. As an example, the IRS database contains a social security number as the primary key field related to a specific user 101, 101'. If the DSDS 201 list of unique identifiers included a social security number, the IRS can forward messages such as an e-mail to the user 101, 101' to notify them of a sizable tax refund. This becomes particularly beneficial when a unified messaging system is capable of creating and routing electronic messages, particularly e-mails, to users 101, 101' without a priori knowledge of their e-mail address.

FIG. 3 illustrates the basic components of line interface device 111. The line interface device 111 is comprised of a transceiver 300, ports for connecting to transmission mediums 301, 301', a port for connected to signal wire 307, an optional processor 310 and memory 320. The transceiver handles the transmission and receipt of data signals between the user 101, 101' and multiplexer 112, 112' as shown in FIG. 1 and FIG. 2 via transmission medium 301. Transmission medium 301 may be a type such as, but not limited to, telephone twisted pair, coaxial cable, fiber optic cable, plastic fiber optic cable, CAT-5 cable, power line, etc. The transceiver 300 may be of a type such as, but not limited to, a DSL modem, cable modem, or codec.

The user connects a device 104, 104', 104" or router 105 as shown in FIGS. 1 and 2 to a port on the line interface device 111 via transmission medium 301' in order to transmit and receive data from a remote source. The ports for transmission medium 301' may include, but are not limited to an RJ-11 jack for telephone twisted pair, an RJ-45 jack for an Ethernet connection, IEEE 1394 Fire Wire connection, USB, RS-232, a PCMCIA slot, fiber optic, etc. The PCMCIA slot can be used as a wireless integration point for systems such as, but not limited to, Bluetooth, 802.11a, 802.11b, ultra wideband, etc. Only one port for transmission medium 301' is shown in FIG. 3 for clarity, but the line interface device may be configured with any combination of additional ports as required.

As an alternative embodiment of the present invention, each line interface device 111 has a unique @Zip geographically-based address directly related to a user name, street address, city, state, and zip code that does not require a priori knowledge of a cryptic e-mail address in order to message user 101, 101' as shown in FIG. 1 and FIG. 2.

The advantage of providing an optional intelligent control or processor 310 and memory 320 is to allow the line interface device to function as a personal e-mail server at the physical geographical location and address for a specific user 101, 101'. In addition, the provision of optional processor 310 and memory 320 allow for geographical based routing to occur closer to the edge of the network which would reduce the overall amount of traffic hops on the Internet.

Figure 4:
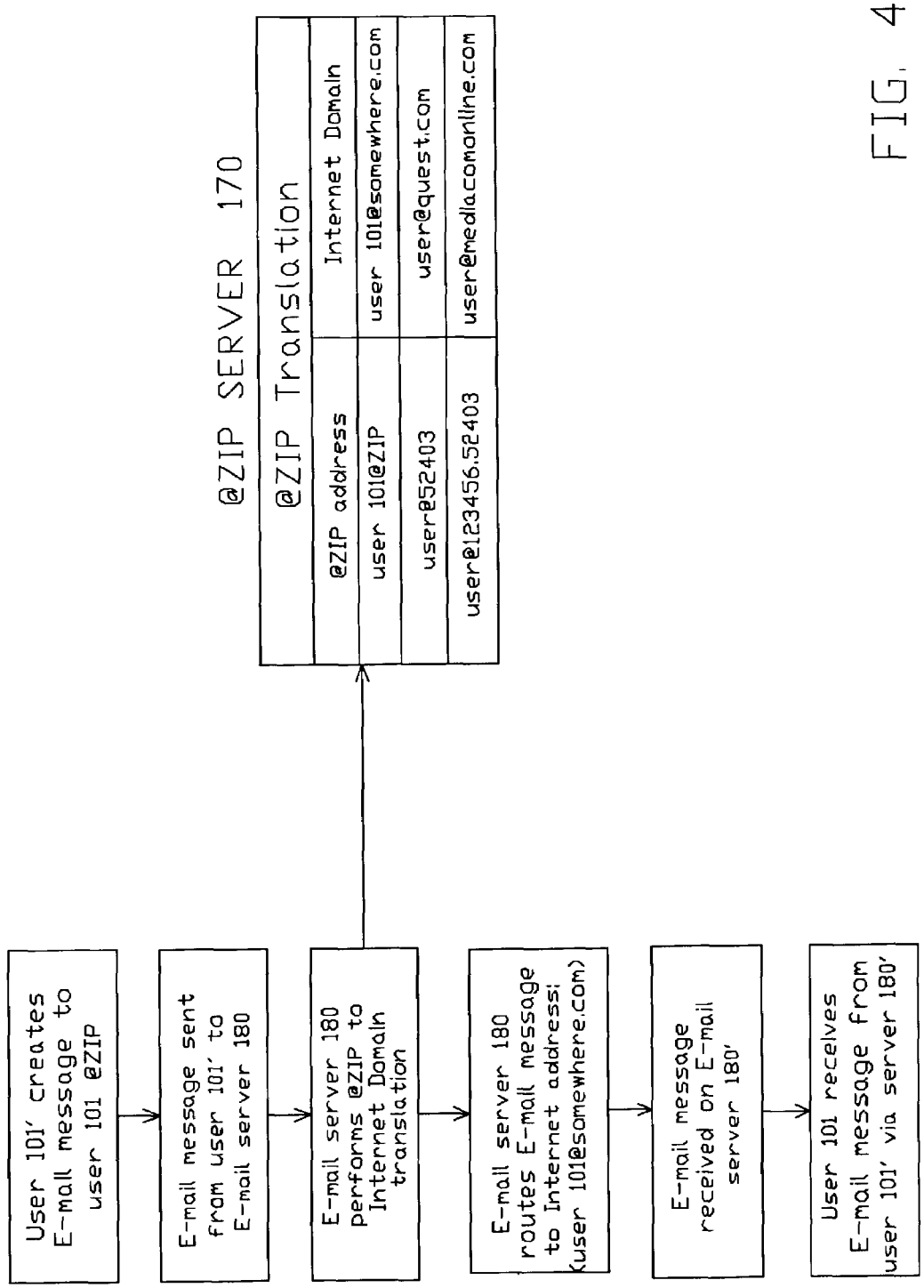
FIG. 4 illustrates a flow chart of routing an e-mail message using the present invention.

FIG. 4 is a flowchart that illustrates the use of @Zip functionality to route and deliver e-mail. This method employs the use of translating geographical-based Internet addresses to other Internet-based addresses that may or may not contain elements.

In the first step, a user 101' using a standard e-mail system such as, but not limited to web-browser based e-mail, Microsoft Outlook, Eudora, Lotus Notes to create an e-mail message for delivery to user 101. User 101' messages user 101 with their @ZIP e-mail address. Once the e-mail is created, user 101's e-mail system forwards the message for delivery to e-mail server 180 as shown in FIG. 1.

After e-mail server 180 receives the e-mail message, it performs typical e-mail server operations, including but not limited to virus scanning, application of mail message quotas and temporary storage of the message. In addition, e-mail server 180 requests @Zip server 170 as shown in FIG. 1 to perform an @ZIP to Internet domain e-mail translation. After this translation request is fulfilled and returned, e-mail server 180 as shown in FIG. 1 uses the translation information to modify the e-mail message header information to allow for the delivery of the e-mail message to the newly obtained Internet domain address.

The message is routed through the Internet 130 as shown in FIG. 1, and subsequently delivered to e-mail server 180' as shown in FIG. 1. E-mail server 180' as shown in FIG. 1 is used by user 101 to view, store, manage, send or retrieve e-mail. User 101 uses their e-mail system of choice, including, but not limited to Microsoft Outlook, Eudora, Lotus Notes, etc. to view, retrieve and/or download their e-mail message.

The present invention can also be used to enhance Homeland Security efforts. @Zip e-mail addresses can be used to further authenticate a user's true identity, as an example for e-tickets issued for travel by airlines or ticket agencies. As #Zip addresses can easily be related to the United States Post Office's database of users and zip codes, which is updated monthly, an e-ticket routed to a @Zip address, and verified in conjunction with the address of a state issued driver's license or identification card, will help to identify an individual as most states include a random number for auditing purposes in their database, this offers additional authentication of an individual.

In another embodiment of the present invention, the present invention provides for unified messaging over a first network, such as the Internet 130, 130' shown in FIG. 1 and FIG. 2. An access network 110, 110' is operatively connected to the Internet 130, 130'. A directory service database 140, 140' is also operatively connected to the Internet 130, 130'. The directory service database 140, 140' is adapted for receiving messages addressed with a first identifier. The first identifier can include one or more flags of various types, including affinity flags, locations flags, and other types of flags. The directory service database 140, 140' then determines users associated with the first identifier, and provides for sending the messages to the users associated with the first identifier. The access network can also include a master database 190 or 190' as shown in FIGS. 1 and 2. The master database 190, 190' is operatively connected to the access network 110, 110' for storing information about subscribers to the access network 110, 110' and is also adapted for addressing a query with the first identifier to the directory service database 140, 140'. The access network 110, 110' can be a telephony network or a cable network. In this embodiment, the master database 190, 190' containing access network subscriber information is maintained separately and privately from the directory service database 140, 140'. However, addressing a message to the first identifier can result in the directory service database 140, 140' sending the message over the access network to subscribers that choose to be associated with the first identifier.

A description of the present invention as well as a preferred embodiment of the present invention has been set forth above. Those skilled in the art to which the present invention pertains will recognize and be able to practice additional variations in the methods and systems described, which fall within the teachings of this invention. Accordingly, all such modifications and additions are deemed to be within the spirit and scope of the invention which is to be limited only by the claims appended hereto.

What is claimed is:

1. A method for electronically routing electronic messages over a network based on location, comprising:
    receiving over the network an electronic message having a first identifier identifying at least one user;
    translating the first identifier identifying the at least one user to at least one second identifier identifying a physical location, each of the at least one second identifier comprising a zip code and a street address, each of the at least one second identifier having a corresponding network address;
    sending the electronic message over the network to the at least one user at the network address corresponding with each of the at least one second identifier to deliver the electronic message to the at least one user at the physical location; and
    automatically updating the second identifier and the corresponding network address as the physical location of a device associated with the at least one user changes.

2. The method of claim 1 wherein the first identifier includes a geo-position.

3. The method of claim 1 wherein the first identifier includes an affinity flag.

4. The method of claim 1 wherein the first identifier includes a calendar flag.

5. The method of claim 1 wherein the first identifier includes a location flag.

6. The method of claim 1 wherein the second identifier further comprises a name.

7. The method of claim 1 wherein the first identifier includes a flag associated with a group of users.

8. The method of claim 1 wherein the first identifier is associated with a group of users.

9. The method of claim 1 further comprising maintaining the second identifier as private to a message sender while revealing the first identifier to the message sender.

10. A directory service for obtaining routing information for routing an electronic message from a sender to a recipient over a network, comprising:
    a medium for storing data;
    means for receiving over the network a zip identifier from an address of the electronic message, the zip identifier comprising a zip code and a street address identifying a physical location of the recipient of the electronic message;
    means for translating the zip identifier to a network address associated with the physical location of the recipient of the electronic message using the data stored on the medium;
    means for returning over the network the network address associated with the recipient of the electronic message, thereby allowing the electronic message addressed to the recipient to be routed to the network address of the physical location associated with the recipient; and means for automatically updating the network address associated with the physical location of the recipient of the electronic message as the physical location of a device associated with the user changes.

11. The directory service of claim 10 further comprising means for receiving a flag; means for determining at least one zip identifier associated with the flag from the data stored on the medium.

12. The directory service of claim 11 wherein the means for determining at least one zip identifier associated with the flag from the data stored on the medium communicates the at least one zip identifier associated with the flag from the data stored on the medium communicates the at least one zip identifier to the means for receiving.

13. The directory service of claim 11 wherein the flag is selected from the set comprising a geoposition flag, an affinity flag, a calendar flag, and a location flag.

14. A system for unified messaging over a first network, comprising:

an access network operatively connected to the first network;

a directory service database operatively connected to the first network, the directory service database adapted for receiving electronic messages addressed with a first identifier, determining users associated with the first identifier, and sending the electronic messages to the users associated with the first identifier;

a database operatively connected to the access network for storing information about subscribers to the access network and adapted for sending a query addressed with the first identifier to the directory service database;

wherein the first identifier comprises physical location information for the users associated with the first identifier;

wherein the database is automatically updated based on reporting of current location information for subscribers over the access network; and wherein the reporting being performed by devices adapted for providing current location information.

15. The system of claim 14 wherein the access network is a telephony network.

16. The system of claim 14 wherein the access network is a cable network.

17. The system of claim 14 wherein the messages are sent over the access network to the users associated with the first identifier.

* * * * *